United States Patent
Faken et al.

(10) Patent No.: US 7,265,770 B2
(45) Date of Patent: Sep. 4, 2007

(54) METHOD OF CAMOUFLAGING DEFECTIVE PRINT ELEMENTS IN A PRINTER

(75) Inventors: Henry Faken, Venlo (NL); Johannes C. G. Vestjens, Venlo (NL)

(73) Assignee: Oce-Technologies B.V., Venlo (NL)

( * ) Notice: Subject to any disclaimer, the term of this patent is extended or adjusted under 35 U.S.C. 154(b) by 218 days.

(21) Appl. No.: 10/996,451

(22) Filed: Nov. 26, 2004

(65) Prior Publication Data

US 2005/0116981 A1 Jun. 2, 2005

(30) Foreign Application Priority Data

Nov. 27, 2003 (NL) .................................. 03078754

(51) Int. Cl.
*B41J 2/355* (2006.01)
*G06K 15/10* (2006.01)
(52) U.S. Cl. ......................................... 347/171; 347/19
(58) Field of Classification Search .................... 347/9, 347/14, 19, 171
See application file for complete search history.

(56) References Cited

U.S. PATENT DOCUMENTS 6,215,557 B1 4/2001 Owens
6,508,531 B1 1/2003 Gargir
2002/0089566 A1 * 7/2002 Lopez et al. .................. 347/43

FOREIGN PATENT DOCUMENTS

| EP | 1060896 A1 | 12/2000 |
| EP | 1384592 A1 | 1/2004 |
| EP | 0999516 | 5/2004 |
| WO | WO-97/31781 | 9/1997 |

* cited by examiner

*Primary Examiner*—Huan Tran
(74) *Attorney, Agent, or Firm*—Birch, Stewart, Kolasch & Birch, LLP

(57) ABSTRACT

A method of camouflaging defective print elements in a printer having a printhead with print elements, and each pixel of the image is assigned to a print element, and image information of a pixel that is assigned to a defective print element shifts to a nearby pixel position capable of printing with a non-defective print element. Shifting the image information includes the steps of a) encoding the image information to be printed as a multi-level pixel matrix in which one of a predetermined set of pixel values ("0", "1", "2") is assigned to each pixel and at least one of the pixel values is a conditional pixel value ("1") encoding a print instruction that depends upon whether or not a neighbouring pixel corresponds to a defective print element, b) determining defective print elements of the printer, and c) executing the print instruction.

15 Claims, 6 Drawing Sheets

38

| 2 | 0 | 0 | 0 | 0 | 0 | 0 | 0 | i+3 |
| 1 | 2 | 0 | 0 | 0 | 0 | 0 | 0 | i+2 |
| 0 | 1 | 2 | 0 | 0 | 0 | 0 | 0 | i+1 |
| 2 | 2 | 2 | 2 | 2 | 2 | 2 | 2 | i |
| 1 | 1 | 1 | 1 | 2 | 1 | 1 | 1 | i-1 |
| 0 | 0 | 0 | 0 | 1 | 2 | 0 | 0 | i-2 |
| 0 | 0 | 0 | 0 | 0 | 1 | 2 | 0 | i-3 |
| 0 | 0 | 0 | 0 | 0 | 0 | 1 | 2 | i-4 | j-4  j-3  j-2  j-1  j  j+1  j+2  j+3

*Fig. 2A*
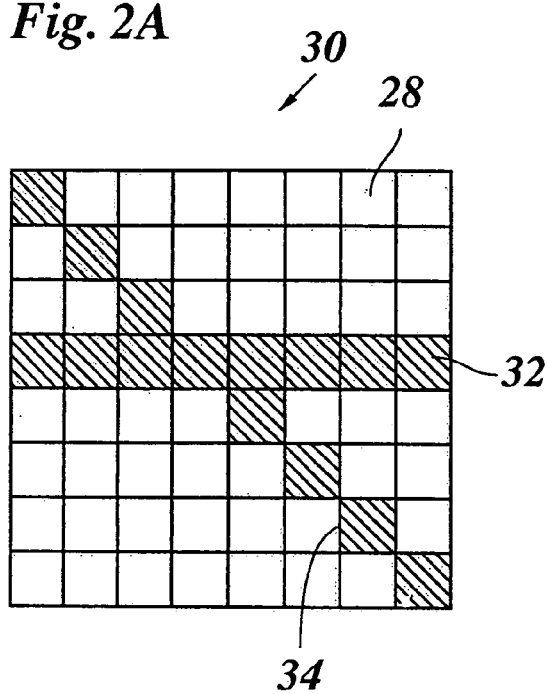
*Fig. 2B*
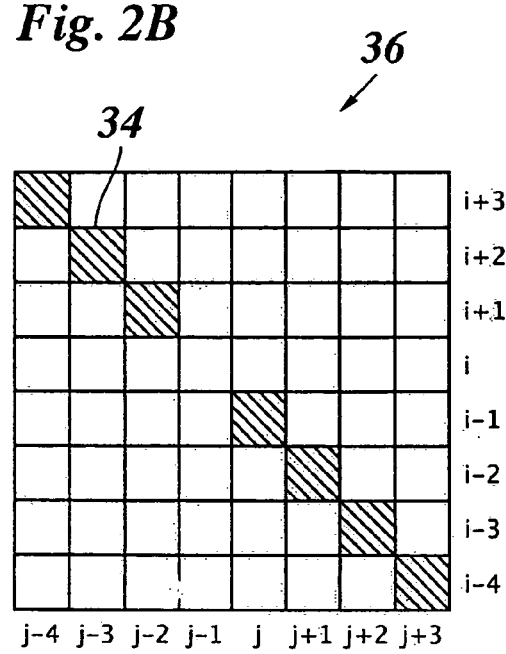
*Fig. 2C*
| 2 | 0 | 0 | 0 | 0 | 0 | 0 | 0 | i+3 |
|---|---|---|---|---|---|---|---|---|
| 1 | 2 | 0 | 0 | 0 | 0 | 0 | 0 | i+2 |
| 0 | 1 | 2 | 0 | 0 | 0 | 0 | 0 | i+1 |
| 2 | 2 | 2 | 2 | 2 | 2 | 2 | 2 | i |
| 1 | 1 | 1 | 1 | 2 | 1 | 1 | 1 | i-1 |
| 0 | 0 | 0 | 0 | 1 | 2 | 0 | 0 | i-2 |
| 0 | 0 | 0 | 0 | 0 | 1 | 2 | 0 | i-3 |
| 0 | 0 | 0 | 0 | 0 | 0 | 1 | 2 | i-4 |
j-4 j-3 j-2 j-1 j j+1 j+2 j+3
*Fig. 2D*
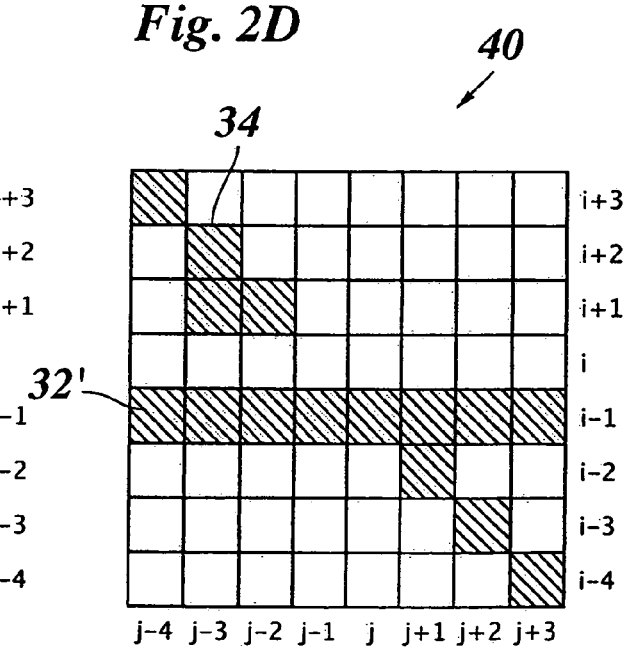

Fig. 5A
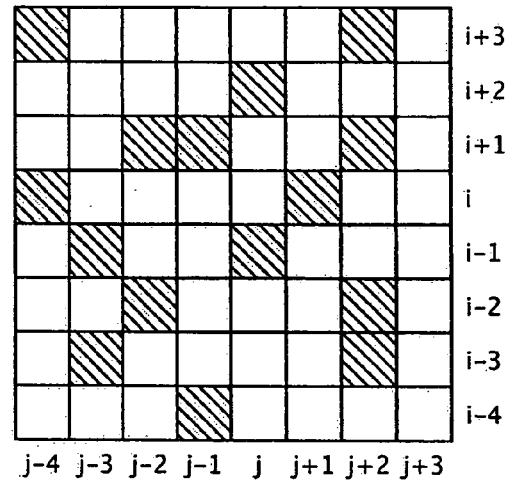
Fig. 5B
| 2 | 0 | 0 | 0 | 1 | 0 | 2 | 0 | i+3 |
|---|---|---|---|---|---|---|---|-----|
| 1 | 0 | 1 | 1 | 2 | 0 | 1 | 0 | i+2 |
| 1 | 0 | 2 | 2 | 1 | 1 | 2 | 0 | i+1 |
| 2 | 1 | 1 | 1 | 1 | 2 | 1 | 0 | i   |
| 1 | 2 | 1 | 0 | 2 | 1 | 1 | 0 | i-1 |
| 0 | 1 | 2 | 0 | 1 | 0 | 2 | 0 | i-2 |
| 1 | 2 | 1 | 1 | 0 | 0 | 2 | 0 | i-3 |
| 0 | 1 | 0 | 2 | 0 | 0 | 1 | 0 | i-4 |
j-4 j-3 j-2 j-1 j j+1 j+2 j+3
Fig. 5C
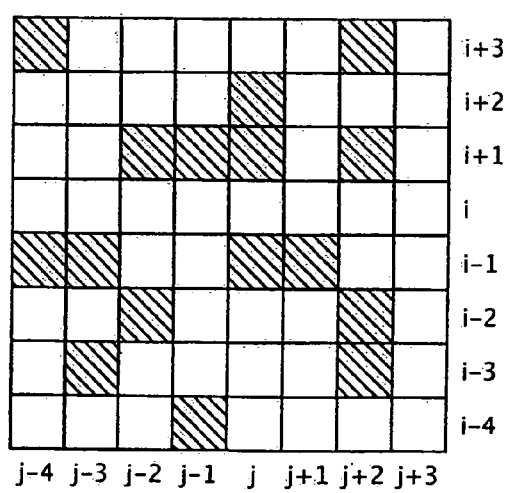

Fig. 6A
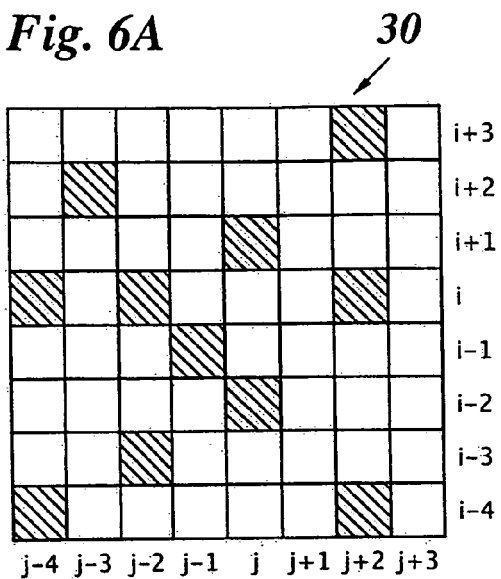
Fig. 6B
| 0 | 1 | 0 | 0 | 0 | 1 | 4 | 1 | i+3 |
|---|---|---|---|---|---|---|---|---|
| 1 | 4 | 1 | 0 | 1 | 0 | 1 | 0 | i+2 |
| 1 | 1 | 1 | 1 | 4 | 1 | 1 | 0 | i+1 |
| 4 | 2 | 4 | 2 | 1 | 1 | 4 | 1 | i |
| 1 | 0 | 2 | 4 | 2 | 0 | 1 | 0 | i-1 |
| 0 | 0 | 1 | 2 | 4 | 1 | 0 | 0 | i-2 |
| 1 | 1 | 4 | 1 | 1 | 0 | 1 | 0 | i-3 |
| 4 | 1 | 1 | 0 | 0 | 1 | 4 | 1 | i-4 |
j-4  j-3  j-2  j-1  j  j+1  j+2  j+3
Fig. 6C
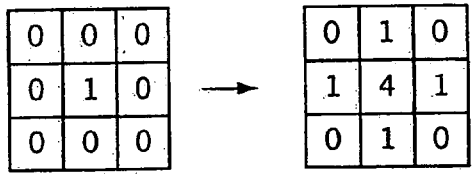
Fig. 6D
| 0 | 0 | 0 | 0 | 0 | 0 | 0 | 0 | i+1 |
|---|---|---|---|---|---|---|---|---|
| 1 | 1 | 1 | 1 | 1 | 1 | 1 | 1 | i |
| 0 | 0 | 0 | 0 | 0 | 0 | 0 | 0 | i-1 |
| 1 | 1 | 1 | 1 | 1 | 1 | 1 | 1 | i+1 |
|---|---|---|---|---|---|---|---|---|
| 5 | 6 | 6 | 6 | 6 | 6 | 6 | 5 | i |
| 1 | 1 | 1 | 1 | 1 | 1 | 1 | 1 | i-1 |
Fig. 7A
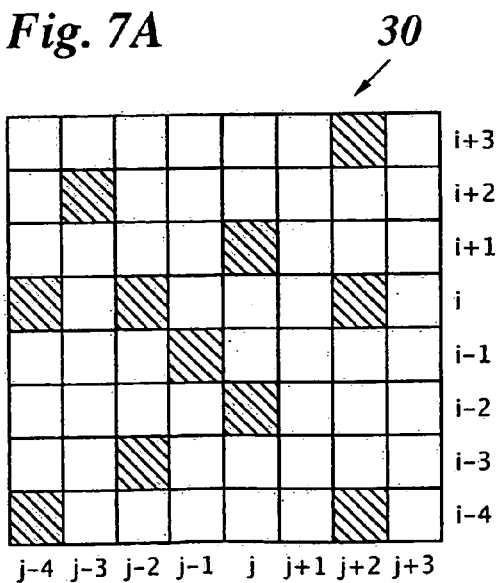
Fig. 7B
| 0 | 1 | 0 | 0 | 0 | 0 | 2 | 1 | i+3 |
|---|---|---|---|---|---|---|---|---|
| 0 | 2 | 0 | 0 | 0 | 0 | 0 | 0 | i+2 |
| 0 | 0 | 0 | 1 | 2 | 0 | 1 | 0 | i+1 |
| 2 | 0 | 2 | 1 | 0 | 0 | 2 | 1 | i |
| 1 | 0 | 1 | 2 | 0 | 0 | 0 | 0 | i-1 |
| 0 | 0 | 0 | 0 | 2 | 0 | 0 | 0 | i-2 |
| 1 | 0 | 2 | 1 | 1 | 0 | 0 | 0 | i-3 |
| 2 | 0 | 0 | 0 | 0 | 1 | 2 | 0 | i-4 |
j-4  j-3  j-2  j-1  j  j+1  j+2  j+3

METHOD OF CAMOUFLAGING DEFECTIVE PRINT ELEMENTS IN A PRINTER

This application claims benefit under 35 U.S.C. §119 of European patent application no. 03078754.3, filed Nov. 27, 2003, the entire contents of which is hereby incorporated by reference.

BACKGROUND OF THE INVENTION

1. Field of the Invention

The invention relates to a method of camouflaging defective print elements in a printer having a printhead with multiple print elements, where each pixel of the image is assigned to a print element with which it is to be printed, and image information of a pixel assigned to a defective print element is shifted to a nearby pixel position where it can be printed by a non-defective print element. The invention also relates to a printer and to a computer program implementing this method.

2. Description of the Related Art

In an ink jet printer, the printhead contains multiple nozzles as print elements. Typically, the nozzles are arranged in a line that extends in parallel with a direction (subscanning direction) in which a recording medium, e.g., paper, is transported through the printer. The printhead scans the paper in a direction (main scanning direction) perpendicular to the subscanning direction. In a single-pass mode, a complete swath of the image is usually printed with a single pass of the printhead, and then the paper is transported by the width of the swath so as to print the next swath. That is, the single-pass mode is generally a mode where a complete line is printed by only one nozzle. When a nozzle of the printhead becomes defective, e.g. becomes clogged, the corresponding pixel line fails to print in the printed image, so that image information is lost and the quality of the print degrades.

A printer may also operate in a multi-pass mode, in which only part of the image information of a swath is printed in a first pass, and the missing pixels are filled-in during one or more subsequent passes of the printhead. In this case, a defective nozzle may possibly be backed-up by a non-defective nozzle, though mostly at the cost of productivity and added expense.

U.S. Pat. No. 6,215,557 typifies the related art discussed above, where a nozzle is defective, and the print data are altered so as to bypass the faulty nozzle. This means that a pixel that would have but cannot be printed with the defective nozzle is substituted by printing an extra pixel in one of the neighbouring lines that are printed with non-defective nozzles. The average optical density of the image area is therefore conserved, and the defect resulting from the nozzle failure is camouflaged and becomes almost imperceptible. This method involves an algorithm that operates on a bitmap that represents the print data, and shifts each pixel that cannot be printed to a neighbouring pixel position.

EP-A-0 999 516 discusses a method for generating a print mask that determines a pattern in which the pixels will be printed. This technology focuses on multi-pass printing, and the main purpose of the mask is to determine which pixels are to be printed in which pass. In the mask generation process, the print image information is only indirectly taken into account in the form of constraints that determine the construction of the mask. For example, such a constraint may require that a yellow pixel and a directly adjacent cyan pixel are not printed in the same pass of the printhead, in order to avoid color bleeding. This document further suggests constructing the masks in such a way that defective nozzles are backed up by non-defective nozzles.

These related art methods require that the locations of the defective nozzles are known before the respective image processing and mask generating steps can be performed. Thus, since the information on the locations of the defective nozzles originates from the printhead, either the printer itself must have sufficient processing capabilities to perform the camouflaging method, or the information on the locations of the defective nozzles must be reverse transmitted in the direction of the print data flow to a print driver or the like, where sufficient processing capability is available.

SUMMARY OF THE INVENTION

It is an object of the invention to provide a method with which image defects that would otherwise be caused by defective print elements, can be camouflaged more efficiently.

The method, in part, pertains to method of camouflaging defective print elements, which includes providing a printer having a printhead with multiple print elements, assigning each pixel of an image to a print element with which it is to be printed, and shifting image information of a pixel that is assigned to a defective print element to a nearby pixel position where it can be printed with a non-defective print element. The shifting including the steps of: a) encoding the image information to be printed as a multi-level pixel matrix in which one of a plurality of predetermined pixel values is assigned to each pixel, and at least one of said predetermined pixel values is a conditional pixel value encoding a print instruction that depends upon whether or not a neighbouring pixel corresponds to a defective print element, b) determining defective print elements of the printer, and c) executing said print instruction.

In the invention, in step (c), the conditional pixel value can be interpreted as a pixel to be printed, when at least one of the neighbouring pixels corresponds to a defective print element, and the conditional pixel value is otherwise interpreted as a pixel not to be printed. Also, the step (c) can include a post-processing step in which, for each pixel to which a conditional pixel value has been assigned, a pixel is printed in the same pixel position or a neighbouring pixel position with a probability that is determined by said conditional pixel value.

In the invention, the post-processing step can include an error diffusion step. The post-processing step can be performed only for pixels in the neighbourhood of a pixel that corresponds to a defective print element. The post-processing step can be performed only for pixels in the neighbourhood of a pixel that corresponds to a defective print element.

In the invention, for a multi-pass print mode, the post-processing can be limited to the pixel line (i) corresponding to a defective print element and to the pixel lines (i−1, i+1) directly above and below this line. For a multi-pass print mode, the post-processing can be limited to the pixel line (i) corresponding to a defective print element and to the pixel lines (i−1, i+1) directly above and below this line.

In the invention, the step (a) can include include a step of constructing the multi-level pixel matrix by assigning a high unconditional pixel value to each pixel that is to be printed according to the original image information, and by incrementing the pixel values of other pixels that are directly adjacent to these pixels. For each pixel to which to high unconditional pixel value has been assigned, the pixel values of its neighbours are increased by equal increments. For for a sequence of pixels to which said high unconditional pixel values have been assigned, an increment is added only to the pixel value of a selected one of the neighbours of each pixel, and the selection of the neighbour, for which the pixel value is incremented, is varied successively.

The invention, in part, pertains to a printer, which includes a printhead controller adapted to carry out the steps (b) and (c) of the method described above. The invention also pertains to an image processor adapted to carry out the step (a) of said method.

The invention, in part, pertains to a printer, which includes a printhead with multiple of print elements, the printer being adapted to camouflage defective print elements by: assigning each pixel of an image to a print element with which it is to be printed; and shifting image information of a pixel that is assigned to a defective print element to a nearby pixel position where it can be printed with a non-defective print element, the shifting including the steps of: a) encoding the image information to be printed as a multi-level pixel matrix in which one of a plurality of predetermined pixel values is assigned to each pixel, and at least one of the predetermined pixel values is a conditional pixel value encoding a print instruction that depends upon whether or not a neighbouring pixel corresponds to a defective print element, b) determining defective print elements of the printer, and c) executing said print instruction.

The invention, in part, pertains to a computer program that includes a computer program code to make a printer execute the method of the invention.

An important feature of the invention lies that the step (a) which requires substantial data processing capacity and processing time is performed "in advance", i.e., at a stage where the actual locations of the defective nozzles, as determined in the subsequent step (b) are not yet known. Then, when a defective print element has been identified in step (b), either manually or automatically, the remaining task is to execute the print instructions that have already been encoded in the pixel matrix for the pixels in the neighbourhood of the pixel that cannot be printed. As a result, the printer itself has no requirement to have enhanced image processing capabilities or to perform time-consuming processing steps in order to camouflage the effect of the defective nozzles. The more time consuming processing operations involved in step (a) may be performed at a location remote from the printer and the result may be buffered, if necessary, while the printer is busy with another print job. This leads to a considerable increase in the productivity of the printer, especially in a multi-user scenario. Moreover, since the step (a) does not depend on the exact locations of the nozzle defects, it is possible to perform this step even before it is known to which printer the data will be sent, i.e., the print data obtained as a result of step (a) are portable among different printers.

The hardware, which is used for performing the step (a) and which may be installed in the printer itself or, alternately, remote from the printer, will preferably be of a type that is suitable for high-speed image processing and may also be used for other complex image processing tasks such as halftoning, gamma correction, contrast enhancement, image segmentation and the like. Thus, the data processing involved in the step (a) can be performed at high speed.

In a simple embodiment of the invention, the predetermined pixel values of the multi-level pixel matrix comprise three values: an unconditional value "0" which stands, in any case, for a white pixel, a pixel value "2" which, in any case, stands for a black pixel, and a conditional pixel value "1", which stands for a black pixel, i.e. the print instruction "print", if at least one of the neighbouring pixels corresponds to a defective print element, and which stands for a white pixel, i.e. the print instruction "don't print", otherwise.

In other embodiments of the invention, the pixel matrix may have a larger number of predetermined pixel values. For example, if an ink jet printer which is capable of dot size modulation, e.g., capable of printing either a small dot or a large dot for each non-white pixel, the predetermined pixel values may comprise the unconditional pixel values "0", "2", and "4", for printing no dot, a small dot, and a large dot, respectively, and the conditional pixel values "1" and "3" for printing a small dot and a large dot, respectively, when one or more non-printable pixels are present in the neighbourhood.

The print instructions encoded by the conditional pixel values may also have a more complex nature and may, for example, specify that a simple error diffusion step (which does not require much processing capacity and time) shall be performed for the pixels adjacent to non-printable pixels. Then, the pixel value assigned to a specific pixel will indicate the weight that is given to this pixel in the error diffusion process.

If the printer operates in a single-pass mode, then a defect of a single nozzle will lead to a complete line of non-printable pixels. In this case, the conditional pixel values will be interpreted as "don't print" for all the pixels except those in the line or lines immediately above and/or below the non-printable line. Then, if the original image data to be printed are binary data, where each pixel has either the value "0" or "1", the multi-level pixel matrix may be constructed as follows. For every pixel having the value "1" in the original print data, the pixel value is changed to an unconditional value, e.g., "2", which stands for a pixel to be printed, and the pixel or pixels immediately above and/or below this pixel obtain a conditional pixel value (e.g., "1").

In multi-pass printing, such as two-pass printing, each pixel line is printed with two different nozzles, and if one of these nozzles is defective, only every second pixel in the line will be missing. Thus, any given non-printable pixel will generally be surrounded by four printable pixels, i.e., the pixels above and below and also its left and right neighbours. Then, the multi-level pixel matrix may be constructed as follows. Every pixel with the value "1" in the original print data is changed to the unconditional value which stands for a pixel to be printed, and the pixel value(s) of one or more of the neighbouring pixels will be incremented by one, provided that its original value was "0". If, for example, four neighbouring pixels are incremented, i.e., the pixels above, below, to the left and to the right of the original "1"-pixel, then the unconditional value "4" will stand for a pixel to be printed in any case, and the conditional values of a pixel may be "1", "2", or "3", depending on how many original "1" pixels are found in its surroundings. The height of the unconditional pixel value will determine the likelihood and/or the intensity (e.g., dot size) with which a pixel will be printed.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

Preferred embodiments of the invention will now be explained in conjunction with the drawings, in which:

FIGS. 2A-D are diagrams of an area of 8×8 pixels of an image, illustrating a first embodiment of the invention;

FIGS. 5A-C are diagrams illustrating embodiment involving error diffusion;

FIGS. 6A-D are diagrams illustrating an embodiment adapted to a two-pass print mode; and FIGS. 7A-B are diagrams illustrating another embodiment adapted to the two-pass mode.

DETAILED DESCRIPTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
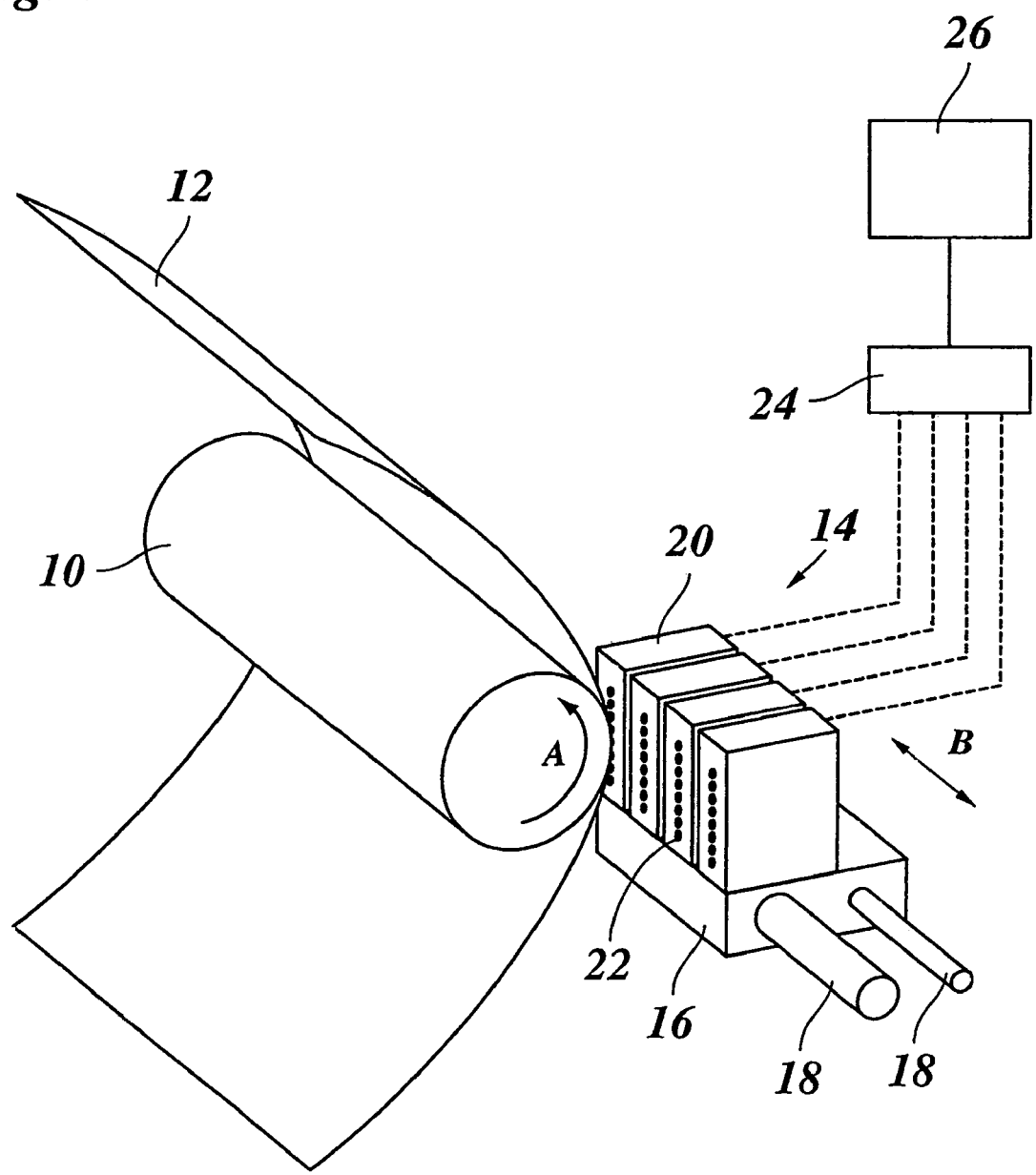
FIG. 1 shows a schematic view of an ink jet printer to which the invention is applicable.

FIG. 1 shows an ink jet printer that includes a platen 10 which serves to transport a recording paper 12 in a subscanning direction (arrow A) past a printhead unit 14. The printhead unit 14 is mounted on a carriage 16 that is guided on guide rails 18 and is movable back and forth in a main scanning direction (arrow B) relative to the recording paper 12. In the example shown, the printhead unit 14 includes four printheads 20, one for each of the basic colors cyan, magenta, yellow and black. Each printhead has a linear array of nozzles 22 extending in the subscanning direction. The nozzles 22 of the printheads 20 can be individually energized to eject ink droplets onto the recording paper 12, thereby printing a pixel on the paper. When the carriage 16 moves in the direction B across the width of the paper 12, a swath of an image can be printed. The number of pixel lines of the swath corresponds to the number of nozzles 22 of each printhead. When the carriage 16 has completed one pass, the paper 12 advances by the width of the swath, so that the next swath can be printed.

The printheads 20 are controlled by a printhead controller 24 that receives print data in the form of a multi-level pixel matrix from an image processor 26 that is capable of high speed image processing. The image processor 26 may be incorporated in the printer or be in a remote device, e.g., a print driver in a host computer. The printhead controller 24 and the image processor 26 process the print data in a manner that will be described in detail below. The discussion will focus on printing in black color, but is equivalently valid for printing in the other colors.

FIG. 2A shows an array of 8×8 pixels 28 of a binary image 30 that is to be printed with the printer shown in FIG. 1. The print data representing the binary image 30 are created in or supplied to the image processor 26. In the example shown, the image 30 comprises a thin horizontal line 32 having only a width of one pixel, and a thin diagonal line 34. The pixels having a binary value "1", i.e., the pixels to be printed in black, are indicated by hatching.

FIG. 2B shows a printed image that would be obtained by printing the binary image 30 when one of the nozzles 22 of the printhead 20 fails. In FIG. 2B, as in the rest of this specification, pixel lines are indicated by their line index ranging from i−4 to i+3, and pixel columns are indicated by their column index ranging from j−4 to j+3. Individual pixels will be referred to by their coordinates, i.e., a pair of a line index and a column index such as (i, j).

It has been assumed in FIG. 2B that the nozzle 22 responsible for printing the line i is defective. As a result, the black line 32 of FIG. 2A is missing in the printed image.

FIG. 2C shows a multi-level pixel matrix 38, a three-level pixel matrix in this exemplary case, which is obtained by applying an image processing routine to the binary image 30 by means of the image processor 26. In the pixel matrix 38, each pixel may have one of three pixel values: "0", "1" and "2". The image data representing the pixel matrix 38 are transmitted to the printhead controller 24 and will be interpreted by the printhead controller as follows. A pixel value "0" means that the pixel shall not be printed, i.e., shall be left blank or white. A pixel value of "2" means that the pixel shall be printed (black). A pixel value of "1" means that the pixel shall be treated as a "0"-pixel and shall not be printed, unless a nozzle failure occurs for one of the pixel lines immediately above and below this pixel. In the latter case, the pixel shall be treated as a "2" pixel and shall be printed. For example, the value "1" of the pixel (i−1, j−1) means that this pixel shall only be printed if either the nozzle needed for printing the line i or the nozzle needed for printing line i−2 is defective.

The printer may be arranged to automatically detect nozzle failures, as is generally known in the art. Thus, the information needed to determine whether or not a nozzle is defective will be available in the printhead controller 24 which interprets the pixel matrix 38. As an alternative, nozzle failures may be manually detected by an operator who will analyse a specific test image and will enter the information identifying the defective nozzles into the printhead controller 24 by using a suitable input.

In the example shown in FIG. 2C, the pixel matrix 38 is derived from the binary image 30 by means of the following algorithm. Every "1" (black pixel) in the binary image 30 is translated into a "2" in the pixel matrix 38. For example, this leads to the pixel value "2" for the pixel (i+3, j−4) in FIG. 2C. In addition, the pixel immediately below this "2"-pixel is changed from "0" to "1". This is the case, for example, for the pixel (i+2, j−4). If, however, the pixel immediately below the "2"-pixel was already a black pixel, then it will be changed to "2" similar to every other black pixel. An example of this is the pixel (i−1, j).

FIG. 2D shows the printed image 40 obtained as a result of this image processing step and its interpretation in the printhead controller 24. It can be seen that, thanks to the algorithm described above, the image information of the black line 32 is not lost, but is replaced by a black line 32' immediately below the defective nozzle. In other words, the line 32 is shifted by one pixel, and this shift will be hardly perceptible to the human eye. In all the pixel lines that are not directly adjacent to the line i of the defective nozzle, (lines i−4 to i−2, i+2 and i+3) the original image information is preserved without any changes. In line i+1, an additional black pixel (i+1, j−3) occurs close to the position, where the diagonal line 34 crosses the horizontal line 32'. This additional black pixel stems from the "2"-pixel (i+2, j−3) Fn FIG. 2C, in which this pixel has caused a "1" occurring immediately below. The main purpose of this "1" was to replace the "2"-pixel in line i+2 if the nozzle for line i+2 should fail. However, since the printhead controller 24 of this embodiment does not distinguish whether a line is located below or above a defective line, the pixel (i+1, j−3)

will be printed black, even though there is no defect in the line i+2. This behaviour leads to a slight overcompensation of the nozzle defect, but is highly welcome here, because it camouflages, to some extent, the gap occurring in the diagonal line 34 in pixel line i.

The algorithm illustrated in FIG. 2C is particularly useful for images, such as CAD graphics, which include thin horizontal lines. Of course, instead of shifting the line 32 one pixel downward, an equivalent strategy would be to shift this line one pixel upward.

If a horizontal line has a width of two pixels and covers, for example, the lines i and i−1, then the algorithm shown in FIG. 2C would have the effect that the pixel is thinned from a width of two pixels to a width of one pixel (the pixels in line i−2 would be changed to "1", but would not be printed, because the nozzle defect is two pixels away). This would be quite an acceptable result. In this case, however, the alternative strategy, where a "1" is added above each "2"-pixel, would have the result that the two pixel wide line would be split into two one-pixel-lines separated by a one pixel gap.

A similar gap and a one-pixel line would occur the line i forms the upper boundary of a solid black area in the original image 30. In this case, the occurrence of a thin line isolated from the rest of the black area would be less favourable.

Another possible strategy would be to insert a "1" pixel alternately above and below each "2" pixel. This strategy would be suitable, for example, for images consisting of extended grey areas, but would be unfavourable for horizontal high-contrast boundaries, because the boundary would become jagged if a nozzle failure occurs right at the boundary.

It will therefore be preferable to adopt the most suitable strategy depending on the contents of the image 30 to be processed. This can be achieved in a straightforward manner by a user defined setting or by employing image processing routines which comprise, for example, image segmentation in order to classify different types of image elements, such as thin lines, high-contrast boundaries, grey-shade areas and the like. In general, the image processing algorithm aims to obtain a printed image 40 that resembles as far as possible the original image 30, regardless of the position where the nozzle failure occurs.

Figure 3A:
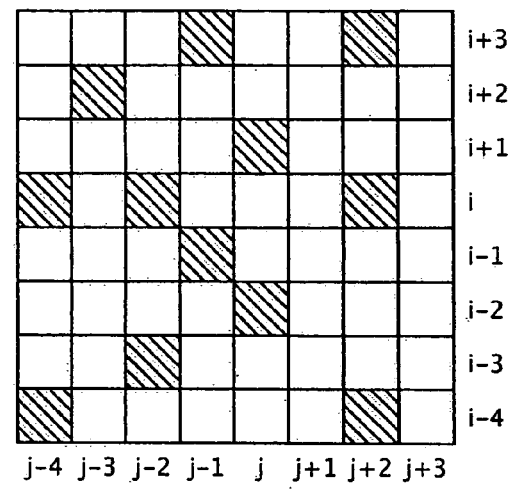
FIGS. 3A-C are diagrams of an area of 8×8 pixels of an image, illustrating a second embodiment of the invention.
Figure 3B:
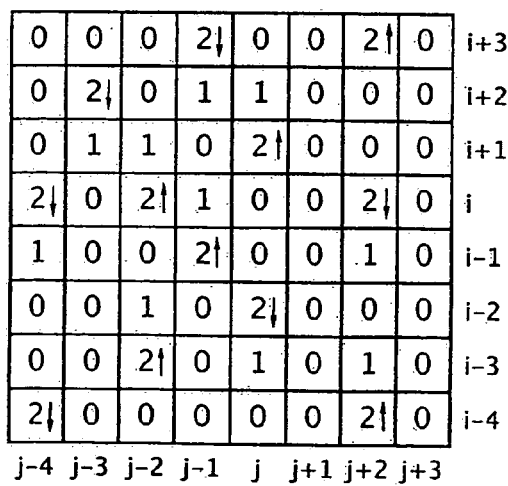
Figure 3C:
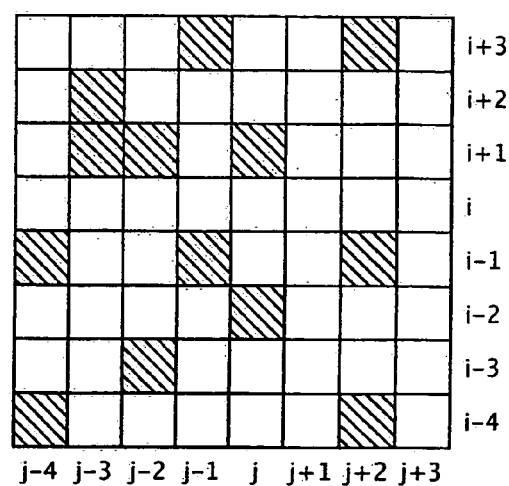

FIGS. 3A-C illustrate an embodiment, in which "1"-pixels are alternately added above and below each "2" pixel. As mentioned already, this embodiment is particularly suitable for a binary image 30, as shown in FIG. 3A, in which the black pixels appear to be scattered randomly over the image area. The corresponding pixel matrix 38 shown in FIG. 3B is constructed almost in the same way as the pixel matrix in FIG. 2B, with the only difference that, for the "2"-pixels, the corresponding "1" pixels are alternately inserted above and below the "2" pixel, as is symbolised by arrows in FIG. 3B. The "1"-pixel that would be created by the "2" pixel (i+3, j+2) is not visible here, because it is outside of the image area.

The printhead controller 24 interprets the pixel matrix 38 in the same way as in FIGS. 2B-C. As shown in FIG. 3C, the resulting printed image 40 is hardly distinguishable from the original image 30, in spite of the nozzle failure in line i. Again, one observes that the sum of black pixels in the lines i−1, i, and i+1 in FIG. 3C is slightly larger than in FIG. 3A, because "1"-pixels are also created by black pixels in the lines i−2 and i+2. If this effect is not desirable, for example for image areas with a relatively high average density, the image processing algorithm may be modified by suppressing some of the additional "1"-pixels. For example, when the pixels are processed line by line, the first "2"-pixel may create a "1" pixel above, the second "2"-pixel creates a "1"-pixel below, and the third "2"-pixel does not create any "1" pixel at all, and then the sequence will be repeated.

Another possible modification that may be suitable for relatively dark image areas would be that the "1"-pixel is not always inserted immediately above or below the "2" pixel, but is shifted to an empty position in the vicinity of the "2" pixel.

Figure 4A:
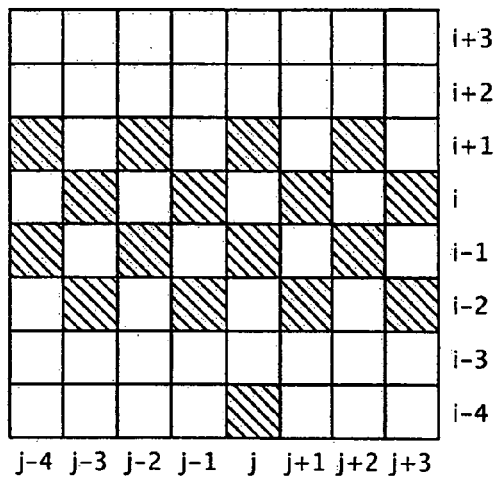
FIGS. 4A-D are diagrams of an area of 8×8 pixels of an image, illustrating a third embodiment of the invention.
Figure 4B:
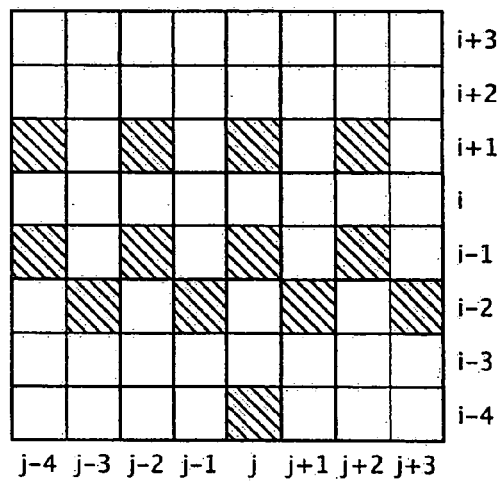
Figure 4C:
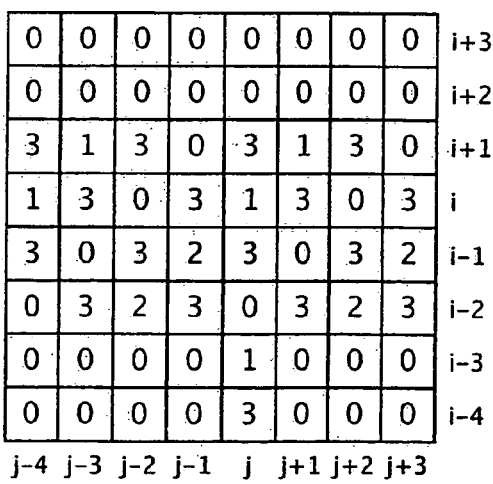

Another embodiment of the invention will now be described in conjunction with FIGS. 4A-D. The binary image 30, shown in FIG. 4A, has the lines i−2 to i+1 forming an extended dark area with an average density of 50%. An isolated black pixel is present at (i−4, j). FIG. 4B shows the corresponding printed image 36 that would be obtained if the nozzle failure in line i were not camouflaged. FIG. 4C shows a corresponding multi-level pixel matrix 38, which in this case is a four-level matrix. Here, the pixel value "3" means that a back pixel shall be printed unconditionally. The pixel value "0" stands again for pixels that are to be left blank, unconditionally. The pixel value "1" means that the pixel shall be printed in black if a nozzle failure occurs in the line immediately below. Conversely, the pixel value "2" means that the pixel shall be printed in black on condition that a nozzle failure occurs in the line immediately above.

When constructing the pixel matrix 38 of FIG. 4C, every black pixel in the original image 30 is changed to a "3". The algorithm for assigning the conditional pixel values "1" and "2" becomes more complex in this case. Since the lines i+2 and i+3 include no black pixels, the line i+1 forms the upper boundary of a grey area. For this reason, no "1"-pixels are provided in line i+2. Thus, even when a nozzle failure would occur for the line i+1, this would not be compensated by any black pixels in line i+2. Nor would there be any additional black pixels in line i for compensating the nozzle failure, because the line i does not contain any "2"-pixels. Thus, when the nozzle for line i+1 fails, this line is simply left white without any compensation, with the result that the boundary between the dark and the white area shifts by one pixel. This has the advantage that a smooth appearance of the boundary is preserved.

Figure 4D:
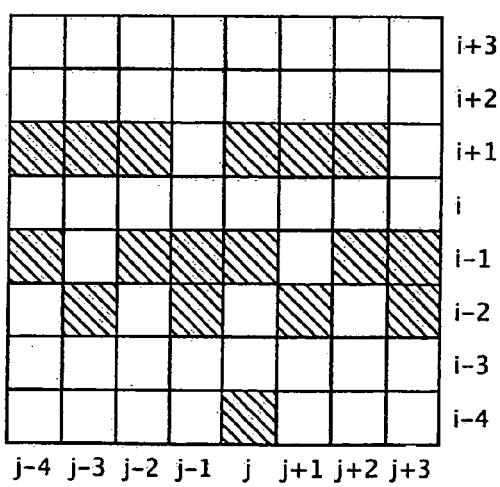

In line i of FIG. 4C, a first "3" occurs at the position j−3. For this reason, a "1" has been assigned to the pixel (i+1, j−3). Thus, if the nozzle for line i fails, then an additional black pixel will be printed in the line i+1, as shown in FIG. 4D. The next "3"-pixel in line i is at the position j−1. Here, the pixel value "2" is assigned to the pixel (i−1, j−1). Thus, a nozzle failure in line i will in this case be compensated by an extra pixel in the line i−1 below, as is also shown in FIG. 4D. For the subsequent "3"-pixels in line i, a "1" and a "2" are alternately inserted in lines i+1 and i−1, respectively. The same algorithm is also applied to the "3"-pixels in line i−1.

The line i−2 forms the lower boundary of the grey area, and the smooth appearance of this boundary should be preserved. For this reason, similarly as for line i+1, there are no "2"-pixels in line i−3, and the pixels above the "3"-pixels at j−3 and j+1 are left at "0". Thus, if a nozzle failure should occur in the boundary line i−2, this failure would have no compensation at all.

The isolated "3"-pixel in line i−4 is treated in the same way as the pixels in lines i and i−1. Thus, a "1" pixel is inserted at the position (i−3, j). In the occurrence of a nozzle failure for line i−4, the missing pixel would be shifted one position upwardly.

When the algorithm described above for lines i and i−1 in FIG. 4C is applied to a larger number of subsequent pixel lines, then, depending on the image contents, a conflict situation may occur for specific pixels. For example, a "3"

above such a pixel may require the pixel value "2", whereas a "3" below this pixel may require a pixel value "1" for the same pixel. This conflict may be resolved by giving priority to either the "2" or the "1". In this case, however, a nozzle failure for one of the two adjacent lines may not be completely compensated.

In view of this problem, a more elaborate embodiment of the invention may provide that all the black pixels in the original image 30 obtain the pixel value "4" instead of "3". Then, the pixel value "3" would indicate that a black pixel shall be printed on condition that a nozzle failure occurs in anyone of the adjacent upper and lower lines. Thus, if a "2" is required because of a black pixel in the upper line, and at the same time a "1" is required because of a black pixel in the lower line, then the values "1" and "2" are added to give the conditional pixel value "3".

The embodiments described above require only minimal data processing in the printhead controller 24. All that has to be done to print a given pixel is to decide whether a nozzle failure occurs in the line above or below this pixel, and then adopt the pertinent interpretation for the conditional pixel values. This can, for example, be achieved using a simple hardware implementation with a network of AND and OR gates.

FIGS. 5A-C illustrate a modified embodiment of the invention which requires slightly more processing capability of the printhead controller 24. The image processor 26 constructs the pixel matrix 38 shown in FIG. 5B on the basis of the binary image 30 shown in FIG. 5A. The pixel matrix is again a three-level matrix, wherein the pixel value "2" is assigned to each of the black pixels in the image 30. In addition, for each of the "2"-pixels in FIG. 5B, a "1" is inserted in the line immediately above and another "1" in the line immediately below. In the event of interference, as for example for the pixel (i+2, j+2) in FIG. 5B, the pixel value is left at "1", although both the pixels (i+3, j+2) above and (i+1, j+2) below have the value "2".

When no nozzle failure occurs, the printhead controller 24 interprets the pixel value "2" as black and the pixel values "0" and "1" as white. When, however, a nozzle failure occurs in the line i, as shown in FIG. 5C, a special treatment is applied to the lines i−1 and i+1. In the example shown, this special treatment consists of a simple one-dimensional error diffusion process with threshold 2. Starting with the first pixel (j−4) in line i+1, the pixel value "1" is below the threshold 2, so that the pixel is left white in FIG. 5C. The residual (1) is added to the pixel value of the next pixel (i+1, j−3). Since the latter pixel value is "0", the sum is still below the threshold, and this pixel is left white as well. The residual (1) is then added to the pixel value "2" of the next pixel (i+1, j−2). Since the sum (3) is now larger than the threshold 2, the pixel is printed in black, and the sum is decremented by the threshold value 2, giving a residual of 1. The same procedure then applies to the next pixel (i+1, j−1), giving again a black pixel and a residual of 1. For the next pixel (i+1, j) the sum reaches the threshold value 2, so that this pixel will be printed in black (although this pixel was white in FIG. 5A). Since there is no residual to be added to the next pixel (i+1, j+1), this pixel is left white. The procedure described above is iterated for the subsequent pixels in line i+1 and then in line i−1, with the residual from the pixel (i+1, j+3) being carried over to the first pixel (i−1, j−4) in the next line. The resulting printed image 40 is shown in FIG. 5C. As a result of the error diffusion process and the selection of the threshold, the average optical density in the lines i−1, i, and i+1 in FIG. 5C will approximately equal to the average optical density in the corresponding lines in FIG. 5A, so that the nozzle failure is compensated. Compared to the previous embodiments, the embodiment described here has the advantage that the image information which has been spread from line i to the adjacent lines will not be lost, even when the position right above or below is already occupied by a black pixel. Thanks to the error diffusion, the image information will instead be propagated to the next empty pixel position.

This embodiment can of course be modified in various ways. For example, it is possible to adopt more complex error diffusion schemes, including also 2-dimensional error diffusion (where part of the error is diffused, for example, from line i+1 to i−1). The threshold employed in the error diffusion process does not have to be an integral number. It would be possible for example to adopt a threshold of 1.8 or 2.2, resulting in a slight tendency towards overcompensation or undercompensation, respectively, of the nozzle failure.

The error diffusion process may also be replaced by other suitable algorithms. For example, the pixel values in lines i−1 and i+1 may each be compared to a respective threshold which varies randomly between 0 and 2, and a black pixel may be printed, when the threshold is exceeded. The result will be that a "1"-pixel will be printed as a black pixel with a probability of 50%. Since every "2" pixel in line i generates two "1" pixels, one in line i−1 and one in line i+1, the average density will be preserved if each of these "1" pixels is printed with a probability of 50%.

The embodiments described above are adapted to a single-pass print mode, in which a nozzle failure leads to the loss of a complete pixel line, but the invention is also applicable to multi-pass printing, where multiple nozzles contribute to a given pixel line. In this situation, the failure of a single nozzle leads only to a loss of a fraction of the pixels of the line. If no substantial post-processing shall be performed in the printhead controller 24, the methods for multi-pass printing will be analogous to what has been described in conjunction with FIGS. 2 to 4. However, this application will possibly have the additional feature that, in the construction of the pixel matrix, a distinction is made as to which of the nozzles that contribute to the same line is defective.

FIGS. 6 and 7 illustrate two embodiments that are specifically adapted to two-pass printing and involve some post-processing such as error diffusion in the printhead controller 24. However, the invention also applies to higher multiple-pass printing.

FIG. 6A shows a binary image that is processed in the image processor 26 so as to construct the pixel matrix 38 shown in FIG. 6B. This pixel matrix is a 8-level matrix having the pixel values ranging from "0" to "8". The construction scheme for the pixel matrix 38 is symbolically shown in FIG. 6C. Every black pixel "1" of the original image 30 changes to a "4", and the pixel values of the upper, lower, left and right neighbours of this pixel are increased by 1. In case of interference, the increments of the pixel value are summed. Thus, the pixel value "2" of the pixel (i, j−3) in FIG. 6B is obtained by adding a "1" from pixel (i, j−4) and another "1" from pixel (i, j−2). Depending upon the configuration of black pixels in the image 30, the sum may reach the maximum value of "8" (a "4" for the central pixel plus four "1"s from four black neighbours).

The pixel matrix 38 is interpreted and post-processed in the printhead controller 24. Again, it shall be assumed for this illustration that a nozzle failure occurs in line i. However, in the two-pass mode, this will have the effect that every second pixel in line i can still be printed. The remaining pixels that cannot be printed, have been crossed out in FIG. 6B. By way of an example, it is assumed that these are the pixels at positions j−4, j−2, j and j+2. Since three of these pixels happen to be black pixels in FIG. 6A, the loss of image information that needs to be compensated amounts to 3 pixels.

The pixels in the lines i−1, i and i+1 are subjected to error diffusion with a threshold of 5. In this error diffusion process, the non-printable pixels in line i are skipped. When the "1"-pixels and "2"-pixels occurring in the lines i−1, i+1 and at the printable positions in line i are summed, the result is 18. Because of the threshold of 5, the number of additional pixels that will be printed in these lines is 18/5=3 with a remainder (residual) of 3. Thus, the three missing pixels in line i will be compensated by three extra pixels in the neighbourhood, and the residual of 3 will be discarded.

The reason for selecting the threshold value 5 in this embodiment will be explained in conjunction with FIG. 6D. The upper block in FIG. 6D shows the lines i−1, i and i+1 of an original binary image, where the lines i−1 and i+1 are white, i is a continuous black line, and black pixels are indicated by the pixel value "1". Here, the total number of black pixels in lines i−1 to i+1 is 8.

The lower block in FIG. 6D shows the corresponding pixel matrix constructed in accordance with FIG. 6C. Summing the pixel values "1", "6", and "5" of all the pixels that participate in the error diffusion gives 39. With a threshold value 5, the number of pixels that will actually be printed is 39/5=7 with a remainder (residual) of 4, and this is the best match to the total number of 8 pixels that should have been printed in line i.

The error diffusion technique is used very locally and requires less computing power, and the error diffusion scheme and the threshold value may therefore be varied as desired.

The embodiment shown in FIGS. 6A-D may in some rare cases lead to artefacts in the form of extra pixels that are added to the original image 30, even when no nozzle failure occurs. As an example, consider the case that the pixel (i, j) is white in the original image 30, but the four adjacent pixels (i+1, j), (i, j−1), (i, j+1) and (i−1, j) are black. Then, the increments from the surrounding pixels will sum up to a pixel value of "4" for the pixel (i, j), and this pixel value would unconditionally be interpreted as black, so that a white pixel would be turned into a black one even when no nozzle failure occurs. This effect may be compensated by providing appropriate modifications in other image processing steps, such as halftoning, gamma correction, and the like.

As an alternative, this embodiment may be modified as follows. Instead of encoding an original black pixel by the pixel value "4", it is encoded by the pixel value "5". This pixel value or a higher pixel value can only be reached when the original pixel was already black. In the printhead controller 24, only pixel values of "5" or higher will now be interpreted unconditionally as black, and the pixel value "4" is interpreted as white when no error diffusion is performed. In the error diffusion process, the pixel value of "5" will only be counted as 4, a pixel value of "6" will be counted as 5, and so on up to the highest possible pixel value of "9", which will be counted as 8.

FIGS. 7A and B illustrate another embodiment of the invention, which is also adapted to a two-pass print mode. The binary image 30 shown in FIG. 7A is the same as in FIG. 6A. However, as is shown in FIG. 7B, the black pixels of the binary image are in this case translated only into the pixel value "2", and an increment of "1" is added only to one of its four neighbours. The selection of the neighbour, to which the increment of "1" is added, rotates counter-clockwise, when the "2"-pixels are processed line by line. This counter-clockwise rotation is indicated by arrows in FIG. 7B. Thus, for the first "2"-pixel (i+3, j+2), an increment of "1" is added only to its right neighbour (i+3, j+3). For the next "2"-pixel (i+2, j−3) an increment is only added to its upper neighbour (i+3, j−3), and so on. In this case, the incremented pixel values may range from "0" to "4", and the values "2", "3" and "4" will be interpreted as black pixels, where no error diffusion is performed. The pixels in the line i of the nozzle failure and the lines immediately above and below are subjected to error diffusion with a suitable threshold value. A consideration similar to the one explained in conjunction with FIG. 6D shows that a threshold value of 3 would be suitable in this situation.

In FIG. 7B, it has been assumed that the nozzle failure causes defects in the pixel positions (i, j−3), (i, j−1), (i, j+1), and (i, j+3). Since these pixels happen to be white in FIG. 7A, no extra black pixels would have to be added in order to compensate for the nozzle failure. As can be seen in FIG. 7A, the total number of black pixels in the lines i−1, i and i+1 is 5. Summing the pixel values of the printable pixels in these lines in FIG. 7B gives 14, and the number of black pixels that will actually be printed, if the error diffusion threshold is 3, will be 14/3=4 with a remainder (residual) of 2, which is very close to the ideal number of 5.

On the other hand, if the other one of the two nozzles that are used for printing the line i becomes defective, then the non-printable pixels would be (i, j−4), (i, j−2), (i, j) and (i, j+2). This would be almost the "worst case" scenario because three of the four pixels happen to be black. In this case, the sum of the pixel values of the printable pixels would be 10, and the number of pixels that are actually printed would be 10/3=3 rest 1. This is smaller than the ideal number 5 but larger than the number (2) of black pixels that would be obtained without any failure compensation. In other words, at least one extra black pixel would be added in the three lines from i−1 to i+1.

One might assume from the above examples that the nozzle failure is somewhat undercompensated in this embodiment. It should be noted, however, that in these examples the black pixels in the lines i−2 and i+2 do not contribute to the pixel values in the lines i−1 and i+1. This is because the "2"-pixel (i+2, j−3) accidentally leads to an increment in the upper line i+3, and the "2"-pixel (i−2, j) leads to an increment in the lower line i−3. The opposite result, leading to an extra "1" in each of the lines i−1 and i+1 could, however, have occurred with the same likelihood. Thus, considering a larger image area, the average result would be better than in the specific examples that have been discussed here.

Of course, the modifications that have been explained in conjunction with FIG. 6 can be equivalently applied to the embodiment of FIG. 7. Moreover, it will be possible in both embodiments to consider not only the four neighbouring pixels, i.e., the left and right, upper and lower neighbours, but to spread the pixel value of a given pixel to all its eight neighbours, including the "diagonal" neighbours such as the pixels (i+1, j−1), (i+1, j+1), (i−1, j−1) and (i−1, j+1) for the central pixel (i, j).

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A method of camouflaging defective print elements, which comprises:
   providing a printer having a printhead with a plurality of print elements;
   assigning each pixel of an image to the print element with which it is to be printed; and
   shifting image information of a pixel that is assigned to a defective print element of the print elements to a nearby pixel position where it can be printed with a non-defective print element of the print elements, the shifting including the steps of:
   a) encoding the image information to be printed as a multi-level pixel matrix in which one of a plurality of predetermined pixel values is assigned to each pixel, and at least one of said predetermined pixel values is a conditional pixel value encoding a print instruction that depends upon whether or not a neighbouring pixel corresponds to the defective print element,
   b) determining defective print elements of the printer, and
   c) executing said print instruction.

2. The method of claim 1, wherein in step (c), said conditional pixel value is interpreted as a pixel to be printed, when at least one of the neighbouring pixels corresponds to the defective print element, and the conditional pixel value is otherwise interpreted as a pixel not to be printed.

3. The method of claim 1, wherein the step (c) includes a post-processing step in which, for each pixel to which a conditional pixel value has been assigned, a pixel is printed in the same pixel position or a neighbouring pixel position with a probability that is determined by said conditional pixel value.

4. The method of claim 3, wherein said post-processing step includes an error diffusion step.

5. The method of claim 3, wherein said post-processing step is performed only for pixels in the neighbourhood of a pixel that corresponds to the defective print element.

6. The method of claim 4, wherein said post-processing step is performed only for pixels in the neighbourhood of a pixel that corresponds to the defective print element.

7. The method of claim 5, wherein, for a multi-pass print mode, the post-processing is limited to the pixel line (i) corresponding to the defective print element and to the pixel lines (i−1, i+1) directly above and below this line.

8. The method of claim 6, wherein, for a multi-pass print mode, the post-processing is limited to the pixel line (i) corresponding to the defective print element and to the pixel lines (i−1, i+1) directly above and below this line.

9. The method of claim 1, wherein the step (a) includes a step of constructing said multi-level pixel matrix by assigning a high unconditional pixel value to each pixel that is to be printed according to the original image information, and by incrementing the pixel values of other pixels that are directly adjacent to these pixels.

10. The method of claim 9, wherein, for each pixel to which said high unconditional pixel value has been assigned, the pixel values of its neighbours are increased by equal increments.

11. The method of claim 9, wherein, for a sequence of pixels to which said high unconditional pixel values have been assigned, an increment is added only to the pixel value of a selected one of the neighbours of each pixel, and the selection of the neighbour, for which the pixel value is incremented, is varied successively.

12. A printer, which comprises a printhead controller adapted to carry out the steps (b) and (c) of the method of claim 1.

13. The printer of claim 12, further comprising an image processor adapted to carry out the step (a) of said method.

14. A printer, which comprises:
   a printhead with a plurality of print elements,
   said printer being adapted to camouflage defective print elements by:
   assigning each pixel of an image to a print element of the print elements with which it is to be printed; and
   shifting image information of a pixel that is assigned to a defective print element of the print elements to a nearby pixel position where it can be printed with a non-defective print element of the print elements, the shifting including the steps of:
   a) encoding the image information to be printed as a multi-level pixel matrix in which one of a plurality of predetermined pixel values is assigned to each pixel, and at least one of said predetermined pixel values is a conditional pixel value encoding a print instruction that depends upon whether or not a neighbouring pixel corresponds to the defective print element,
   b) determining defective print elements of the printer, and
   c) executing said print instruction.

15. A computer program embodied on a computer readable medium, said computer program including program code to make a printer having a printhead with a plurality of print elements execute a method of camouflaging defective print elements, comprising the steps of:
   assigning each pixel of an image to the print element with which it is to be printed; and
   shifting image information of a pixel that is assigned to a defective print element of the print elements to a nearby pixel position where it can be printed with a non-defective print element of the print elements, the shifting including the steps of:
   a) encoding the image information to be printed as a multi-level pixel matrix in which one of a plurality of predetermined pixel values is assigned to each pixel, and at least one of said predetermined pixel values is a conditional pixel value encoding a print instruction that depends upon whether or not a neighbouring pixel corresponds to the defective print element,
   b) determining defective print elements of the printer, and
   c) executing said print instruction.

* * * * *